United States Patent
Kapron

[11] 3,832,028
[45] Aug. 27, 1974

[54] COUPLER FOR OPTICAL WAVEGUIDE LIGHT SOURCE

[75] Inventor: Felix P. Kapron, Elmira, N.Y.

[73] Assignee: Corning Glass Works, Corning, N.Y.

[22] Filed: Mar. 30, 1972

[21] Appl. No.: 239,744

[52] U.S. Cl. ...... 350/96 WG, 65/DIG. 7, 350/96 R, 350/175 GN
[51] Int. Cl. ............................................. G02b 5/14
[58] Field of Search ............................... 350/96 WG

[56] References Cited
UNITED STATES PATENTS

| | | | |
|---|---|---|---|
| 3,043,910 | 7/1962 | Hicks | 350/96 B X |
| 3,187,627 | 6/1965 | Kapany | 350/96 B X |
| 3,395,366 | 7/1968 | Snitzer et al. | 350/96 WG X |
| 3,590,248 | 6/1971 | Chatterton | 350/96 WG UX |
| 3,610,727 | 10/1971 | Ulrich | 350/96 WG |
| 3,610,755 | 10/1971 | Wieberger | 350/96 WG UX |
| 3,614,197 | 10/1971 | Nishizawa et al. | 350/96 WG |
| 3,617,109 | 11/1971 | Tien | 350/96 WG |
| 3,659,915 | 5/1972 | Maurer et al. | 350/96 WG |

*Primary Examiner*—John K. Corbin
*Attorney, Agent, or Firm*—William J. Simmons, Jr.; Clarence R. Patty, Jr.

[57] ABSTRACT

A light coupler for transferring optical wave energy to or from light transmitting means including at least one optical waveguide. The coupler comprises a tapered core of transparent material of refractive index $n_1$ and a layer of transparent cladding material of refractive index $n_2$ disposed upon the surface of the tapered core, $n_1$ being greater than $n_2$. The tapered core has a large diameter end which is aligned with an end of the light transmitting means and a small diameter end which is disposed adjacent to electro-optic energy conversion means such as a light emitting diode, a light detector or the like. When used at the transmitting end of an optical communication system, the small diameter end of the tapered core receives light from a source, and the coupler functions to collimate those light rays which enter the small diameter end and which reflect from the core-cladding interface thereof.

13 Claims, 6 Drawing Figures

PATENTED AUG 27 1974  3,832,028

COUPLER FOR OPTICAL WAVEGUIDE LIGHT SOURCE

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as "optical waveguides" which normally consist of an optical fiber having a transparent core having a refractive index $N_1$ surrounded by a layer of transparent cladding material having a refractive index $N_2$ which is lower than $N_1$. The diameter of the waveguide core may range from about the wavelength of light for a single mode waveguide up to about 1,000 μm for multimode waveguides, the maximum diameter being limited by the stiffness of the fiber. Many multimode waveguides of current interest have core diameters less than 25 μm since the bandpass of waveguide decreases as the core size and the number of propagated modes increases. Since multimode waveguides which propagate only relatively few modes can carry much more information, such guides are preferred over those which propagate many thousands of modes. In some instances a plurality of waveguide fibers are disposed in side-by-side relation to form a fiber bundle in order to propagate to the receiver more light than can be carried by a single fiber.

Light from the source is usually directed toward an endface of the optical fiber or fiber bundle. From a geometrical optics viewpoint, the meridional entrance cone in the external medium is limited to the half angle $\psi$ measured from the fiber axis, wherein $$\psi = \sin^{-1} \sqrt{N_1^2 - N_2^2}/N_o \tag{1}$$

where $N_o$ is the refractive index of the external material at the entrance face. The numerical aperture ($NA$) of such an optical fiber, which is a measure of the light gathering ability thereof, is defined as follows:

$$NA = N_o \sin\psi = \sqrt{N_1^2 - N_2^2} \tag{2}$$

It has been well known in the art that light can be propagated along a transparent fiber structure having a higher refractive index than its surroundings. In such conventional optical fibers the ratio of the total diameter to the core diameter is almost unity, and the difference between refractive indices of the core and cladding material is made as large as possible. However, the total diameter to core diameter ratio of optical waveguide fibers is usually between about 10:1 and 300:1 for single-mode optical waveguides and is usually between about 1,001:1,000 and 10:1 for multimode optical waveguides, and the difference in indices of refraction is maintained small. In accordance with equation (2) this small difference between core and cladding refractive indices in optical waveguides results in a numerical aperture that is smaller than that of conventional optical fibers. Whereas the numerical aperture of commercial optical fibers or light pipes of the conventional type may be as high as about 0.6, the numerical aperture of an optical waveguide is usually about 0.1. Although optical waveguides of the type disclosed in copending Pat. application Ser. No. 36,267 filed by D. B. Keck et al. on May 11, 1970, now U.S. Pat. No. 3,711,262 are capable of propagating light over long distances with relatively low attenuation, suitable means must be provided for efficiently coupling an optical source to such waveguides before a practical optical communication system can be realized.

Due to the relatively low acceptance angles or numerical apertures exhibited by optical waveguides, radiation from the waveguide light source must be highly directional to efficiently couple to the waveguide. Since a coherent light source having the described characteristics can yield efficient coupling, lasers have usually been considered for this role. Heretofore, light from conventional lasers has usually been focused onto the core of an optical waveguide in the manner disclosed in U.S. Pat. No. 3,395,331 issued to E. Snitzer. It is often desirable to utilize incoherent light sources such as light emitting diodes, lamps and the like as light sources for optical waveguides. For example, solid state sources are advantageous in that they are more rugged and compact than conventional lasers and are more compatible with solid state circuitry. However, since the radiation patterns from these sources are not as directional as lasers, the coupling of light directly therefrom into an optical waveguide fiber or a bundle thereof has been extremely inefficient.

SUMMARY OF THE INVENTION

The present invention relates to a light coupler which is useful in optical communication systems of the type comprising light transmitting means including an optical waveguide or a bundle thereof disposed in side-by-side relation. In accordance with the present invention the light coupler is characterized in that it comprises a tapered core of transparent material and a layer of transparent cladding material disposed upon the surface of the core, the refractive index of the core material being greater than that of the cladding material. Means are provided for supporting the large diameter end of the light coupler core adjacent to an end of the light transmitting means, and electro-optic energy conversion means is disposed adjacent to the small diameter end of the core.

As compared to multimode element corrected lens or mirror systems, the light coupler of the present invention offers simplicity and ease of manufacture. Such couplers are compact and structurally rigid. It is possible to directly contact the large diameter end of the light coupler to one end of an optical waveguide or bundle thereof and to directly contact the small diameter end of the coupler to a light source or light detector.

DESCRIPTION OF THE PREFERRED EMBODIMENTS

Figure 1:
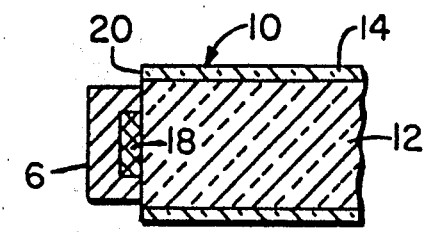
FIG. 1 is a cross-sectional view of a prior art arrangement for coupling light to an optical waveguide.

FIG. 1 shows the transmission portion of an optical communication system including an incoherent light source 6 such as a light emitting diode (LED) coupled to the input end of an optical waveguide 10 which consists of a core 12 of transparent material having a refractive index $N_1$ surrounded by a layer 14 of transparent cladding material having a refractive index $N_2$ which is lower than that of core 12. In the prior art arrangement illustrated, portion 18 of diode 6 emits light in such a pattern that a substantial portion thereof is not within the acceptance angle of waveguide 10. That light emitted by diode 6 which is incident upon the entrance face 20 of waveguide 10 at an angle greater than the acceptance angle $\psi$ as defined by equation (1) will not be propagated down the waveguide fiber. Such a combination of a waveguide fiber and LED is disclosed in the Bell Lab. Record, v. 49, No. 11, Dec., 1971 which describes a GaAs LED having a 50 μm light-emitting area butted against a multimode fiber having a 50 μm core diameter. Although the diode emitted several milliwatts of optical power, only about 1 milliwatt was coupled into the fiber due to the low numerical aperture thereof.

Figure 2:
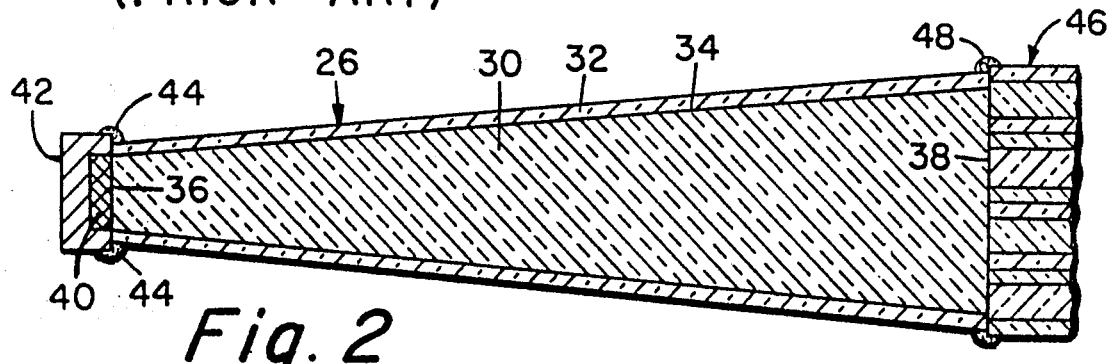
FIG. 2 is a cross-sectional view of a transmitting portion of an optical communication system including a light coupler constructed in accordance with the present invention.

The present invention relates to a device for increasing the amount of light coupled from an incoherent source into an optical waveguide or bundle. The light coupler 26 of the present invention, which is illustrated in FIG. 2, consists of a tapered core 30 of transparent material having a refractive index $n_1$ surrounded by a layer 32 of transparent cladding material having a refractive index $n_2$ which is lower than $n_1$. An interface 34 exists between core 30 and cladding layer 32. Both core 30 and cladding layer 32 may be made of any material such as glass, plastic or the like having the required light transmitting properties and relative refractive indices. For example, the core may be formed of a flint glass having a refractive index of 1.75 and the cladding may be formed of a crown glass having a refractive index of 1.52. Core 30 could also be made of the same material as the core or cores of the associated optical waveguide or bundle. Thus, if the optical waveguide bundle 46 is made of materials set forth in the aforementioned Keck et al. application, core 30 could be formed of doped fused silica, and cladding layer 32 could be pure fused silica. However, this combination of materials would result in a coupler having a relatively low input numerical aperture as compared with the aforementioned glasses. It will be shown that fused silica can be advantageously used in an embodiment wherein the refractive index of the light coupler core varies along the length thereof. Core 30 has a small diameter endface 36 and a large diameter endface 38 which are preferably optically polished. The diameter of endface 36 may be made large enough to encompass the light emitting area 40 of diode 42, and that of endface 38 may be chosen to approximate the diameter of the effective area of the light transmitting means with which the light coupler is associated. When the transmitting means is a single optical waveguide the effective light transmitting area thereof is the area of the core and that portion of the cladding adjacent to the core wherein a significant amount of evanescent energy exists. When the transmitting means is a fiber bundle such as bundle 46, the effective area is substantially the entire cross-sectional area thereof. Coupler 26 may be affixed to diode 42 and fiber bundle 46 by beads 44 and 48, respectively, of bonding material.

Figure 3:
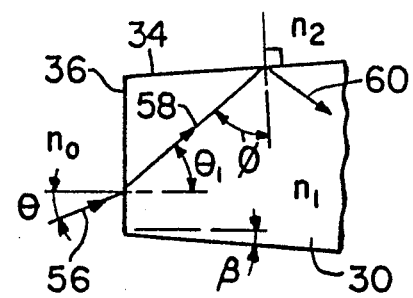
FIG. 3 is a diagram illustrating the operation of the input end of the light coupler of the present invention.

In a preferred embodiment of the present invention, LED 42 is in direct contact with endface 36. The diagram of FIG. 3 illustrates the effect of such an embodiment on a light ray 56 emitted by the LED. Only core 30 is illustrated in this figure which contains the symbols $n_1$, $n_2$ and $n_o$ as representing the refractive indices of the core and cladding materials and the LED, respectively. Since the refractive index of an LED is very high, $n_o$ will be greater than $n_1$ and a ray incident upon endface 36 at an angle $\theta$ which is greater than the critical angle $\theta_o$ will reflect from rather than enter endface 36 where $$\theta_o = \sin^{-1}(n_1/n_o)$$

(3)

If a ray 56 is incident upon endface 36 at an angle $\theta$ which is less than $\theta_o$ it will enter core 30 and refract away from the normal, ray 58 representing the refracted light. Thus, angle $\theta_1$, which the refracted ray 58 makes with the normal, is greater than the angle $\theta$.

Some light rays which enter core 30 will not strike interface 34 and will pass through coupler 26 with their angular orientation being unaffected thereby. The situation wherein ray 56 is incident upon endface 36 at an angle which is less than $\theta_o$ but which is sufficiently large to cause refracted ray 58 to reflect at least once from interface 58 can be described by the equation $$n_o \sin\theta = n_1 \cos(\phi - \beta)$$

(4)

where $\phi$ is the angle that ray 58 makes with the normal to interface 34 and $\beta$ is the taper half-angle of core 30. As the angle $\theta$ increases, the angle $\phi$ decreases, and eventually, a critical value $\phi_c$ is reached beyond which ray 58 will pass through interface 34, where $\phi_c$ is given by $$\phi_c = \sin^{-1}(n_2/n_1)$$

(5)

assuming that the critical angle $\phi_c$ is equal to or greater than the taper half-angle $\beta$, a condition which exists for typical values of $n_1$ and $n_2$. In this situation, the input numerical aperture $NA_{in}$ of the coupler is $$NA_{in} \equiv n_o \sin\theta_c = n_1 \cos(\phi_c - \beta) \tag{6}$$

where $\theta_c$ is the value of $\theta$ resulting in a refracted ray 58 which strikes interface 34 at the critical angle $\phi_c$. Equations (5) and (6) can be combined to provide $$NA_{in} = \sqrt{n_1^2 - n_2^2} \cos\beta + n_2 \sin\beta \tag{7}$$

If the input numerical aperture is critical, i.e., if the light coupler 26 must accept all light impinging upon entrance face 36 within a specified angle $\theta$, then equation (7) can be used to design a light coupler if some of its geometrical parameters are known. If the materials are known from which core 30 and cladding layer 32 are made, then $n_1$ and $n_2$ are known. A particular light source 42 will have a known refractive index. By substituting the required $NA_{in}$ and known values of $n_1$ and $n_2$ into equation (7), the taper half-angle $\beta$ can be determined. A specific light source will determine the radius $R$ of endface 36, and the size of the light transmitting means 46 determines the radius A of endface 38. The length $L$ of the coupler can then be determined by the equation.

$$L = (A - R)\cot\beta \tag{8}$$

Figure 4:
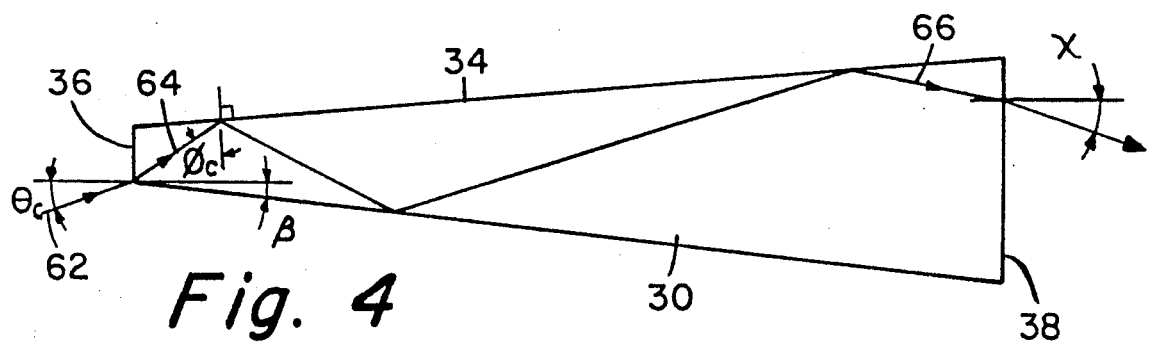
FIG. 4 is another diagram which further illustrates the operation of the present invention.

With each internal reflection the angle which a light ray makes with the longitudinal axis of core 30 decreases by $2\beta$. Thus, the angle which ray 60 of FIG. 3 makes with the longitudinal axis of core 30 is $2\beta$ less than the angle which ray 58 makes therewith. As shown in FIG. 4, a ray 62 entering the edge of endface 36 at angle $\theta_c$ will result in a refracted ray 64 which undergoes the maximum number of reflections. The finally reflected ray 66 makes an angle with respect to the longitudinal axis of core 30 that is $2M\beta$ less than the angle which ray 64 made therewith, where $M$ is the total number of reflections. The output angle $\chi$ is related to the input angle $\theta$ by the refractive indices of the light source, core, and optical waveguide as well as the total number of reflections.

The figures depicting the various embodiments are not drawn to scale but are shown in such a manner as to illustrate the present invention. For example, the core taper need not be perfectly linear as illustrated. However, couplers having substantially linearly tapering cores can be obtained by heating a large diameter fiber and drawing the same in accordance with techniques well known in the fiber optic fabrication art. By controlling the temperature and the pulling force, the desired taper angle can be achieved. Moreover, the thickness of the cladding layer need not be constant, and probably will not be perfectly constant if the light coupler is made by the aforementioned drawing process. The thickness of the cladding layer should be great enough to prevent any significant amount of evanescent energy from reaching the outer surface thereof. This minimum cladding thickness is determined by the refractive indices of the transparent core and cladding materials and is usually no less than about 10 times the wavelength of light propagation through the device.

In the above described embodiment the light coupler core consists of a homogeneous element, the refractive index of which is constant throughout its length. However, each end of core 30 of FIG. 2 has its own refractive index requirements. The refractive index of core 30 in the vicinity of endface 36 should be as high as possible so that light rays which enter endface 36 and are incident upon interface 34 at small angles with respect to the normal thereto are reflected from that interface. The refractive index of that portion of core 30 at endface 38 should be similar to that of the core material in the light transmitting medium to provide maximum coupling efficiency at that interface. To illustrate this problem, assume that the light transmitting means is made from doped fused silica and has a refractive index less than 1.5. If core 30 had a refractive index of about 1.5 in order to provide good coupling efficiency between coupler 26 and light transmitting means 46, the numerical aperture of the coupler at endface 36 would be relatively low and much of the light incident upon interface 34 near endface 36 would escape from the coupler. This problem can be overcome by providing a coupler core having a refractive index which varies either gradually or in a stepped fashion. For example, the embodiment of FIG. 2 could utilize a core fabricated by the technique described in U.S. Pat. application Ser. No. 239,702 entitled "Optical Waveguide Light Source Coupler" filed by F. P. Kapron and D. B. Keck on even date herewith, now U.S. Pat. No. 3,779,628. That application describes a process whereby a boule of doped fused silica is formed by a flame hydrolysis process, the amount of dopant present in the boule being relatively low at one end and gradually increasing toward the other end of the boule. Thus, the refractive index of that end of core 30 adjacent to endface 38 could be about 1.46 and the refractive index of the core could gradually increase toward endface 36 where increased dopant concentration could increase the refractive index to about 1.50.

Figure 5:
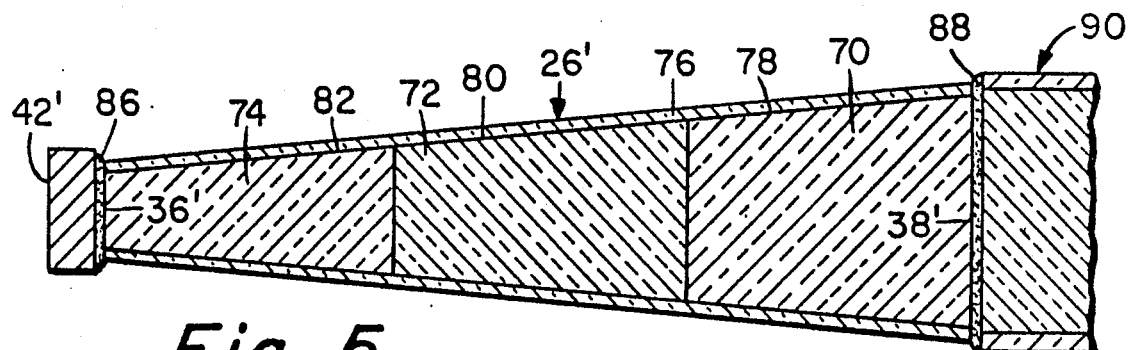
FIG. 5 is a cross-sectional view of a further embodiment of the present invention which utilizes a plurality of tapered core sections.

In the embodiment illustrated in FIG. 5, the coupler core consists of sections 70, 72 and 74, which are named in order of increasing refractive index. Cladding layer 76 makes an interface 78 with section 70, an interface 80 with section 72 and an interface 82 with section 74. In this embodiment, thin transparent layers 86 and 88 bond coupler 26' to light source 42' and optical waveguide 90, respectively. Layers 86 and 88 may consist of epoxy or other suitable transparent bonding material having a refractive index approaching that of the materials disposed adjacent thereto. It is preferred that endfaces 36' and 38' be in direct contact with the elements disposed adjacent thereto as shown in FIG. 2. If the light source must be spaced from endface 36' such as by the layer of bonding material 86, the refractive index of the bonding material should be as high as possible so that a maximum amount of light is transferred from the source into the coupler.

Since section 74 has a relatively high refractive index, that end of light coupler 26' adjacent to entrance face 36' has a relatively high numerical aperture and accepts a relatively large portion of the light emitted by source 42'. Thus, even those light rays entering endface 36' and being incident upon interface 82 at relatively small angles with respect to the normal thereto are totally internally reflected and propagate toward endface 38'. As shown hereinabove, each reflection which a light ray undergoes reduces the angle which the reflected ray makes with the longitudinal axis of the coupler by twice the taper half-angle $\beta$. Therefore, after a ray reflects a number of times from interface 82, it can enter section 72 and reflect from interface 80 even though the refractive index difference between section 72 and cladding layer 76 is less than the refractive index difference between section 74 and cladding layer 76. Similarly, the ray enters section 70 making an even smaller angle with respect to the longitudinal axis of the coupler after having undergone a number of reflections within section 72. Section 70 can be made from doped fused silica having a refractive index approaching that of the core of waveguide 90, thus providing good coupling efficiency between coupler 26' and optical waveguide 90.

Figure 6:
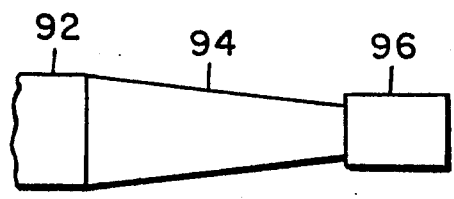
FIG. 6 shows the receiving portion of an optical communication system which utilizes the light coupler of the present invention.

FIG. 6 shows the receiver portion of an optical communication system including light transmission means 92 having a light coupler 94 disposed adjacent to the end thereof. Output coupler 94 may be constructed in a manner similar to any of the input couplers described hereinabove. Light detector 96 is disposed immediately adjacent to the small diameter end of coupler 94.

The cross-sectional shape or configuration of optical waveguides and fiber bundles is substantially circular, and it is therefore preferred that the cross-sectional shape of the larger end of the light coupler also be circular. However, this portion of the coupler could have any desired shape depending upon the shape of the waveguide or waveguide bundle to which it is connected. Similarly, the cross-sectional shape of the input or smaller end of the light coupler could be elliptical or elongated in some other manner depending upon the shape of the light emitting area of the light source. For example the smaller end of the coupler could be elliptical in cross-section and the larger end could be circular.

I claim:
1. An optical communication system comprising
 light transmitting means including at least one optical waveguide for propagating optical wave energy,
 a light coupler having a tapered core of transparent material and a layer of transparent cladding material disposed upon the surface of said core, the refractive index $n_1$ of said core material being greater than the refractive index $n_2$ of said transparent cladding material, said core having a small diameter endface and a large diameter endface, both said endfaces being perpendicular to the axis of said core, the refractive index of said tapered core varying throughout the length thereof, the refractive index at the large diameter end of said core being less than that at the small diameter end thereof,
 means for supporting the large diameter endface of said core adjacent to an end of said light transmitting means so that said core is aligned with the light transmitting area of said light transmitting means, and
 light source means disposed adjacent to the small diameter endface of said core for directing light onto the small diameter endface of said core.

2. An optical communication system in accordance with claim 1 wherein the taper half-angle $\beta$ of said core is given by the following equation $$NA_{in} = \sqrt{n_1^2 - n_2^2} \cos\beta + n_2 \sin\beta$$

where $NA_{in}$ is a predetermined input numerical aperture, and the axial length $L$ of said coupler is given by the following equation $$L = (A - R) \cot\beta$$

where $A$ is the radius of the light emitting area of said light source means and $R$ is effective light transmitting area of said light transmitting means.

3. An optical communication system in accordance with claim 1 wherein said light transmitting means comprises a bundle of optical waveguides disposed in side-by-side relation.

4. An optical communication system in accordance with claim 1 wherein said light transmitting means comprises a single optical waveguide, the core of which is substantially aligned with the large diameter end of said coupler core.

5. An optical communication system in accordance with claim 1 wherein the refractive index of said core varies gradually.

6. An optical communication system in accordance with claim 1 wherein said core consists of a plurality of regions each having a refractive index different from the adjacent region.

7. An optical communication system in accordance with claim 1 wherein said light source means comprises a light emitting diode the light emitting area of which is disposed adjacent to the small diameter end of said core, said small diameter end being at least as large as said light emitting area of said diode.

8. In an optical communication system of the type comprising
 a fiber bundle having a plurality of optical waveguides disposed in side-by-side relation,
 a light emitting diode having a first surface from which light is emitted,
 a light coupler having an input end for receiving light from said diode and an output end for emitting light into said fiber bundle,
said coupler being characterized in that it comprises
 a tapered core of transparent material, said tapered core having a polished small diameter endface disposed adjacent to said first surface of said diode, and a large diameter endface at the output end of said coupler, the refractive index of said tapered core varying throughout the length thereof, the refractive index at the large diameter end of said core being less than that at the small diameter end thereof,
 a layer of transparent cladding material disposed upon the surface of said core, the refractive index of said tapered core material being greater than that of said coupler cladding material, the minimum thickness of said coupler cladding layer being at least ten times the wavelength of light which said source is adapted to provide, and
 means for supporting said large diameter endface adjacent to an end of said fiber bundle so that said tapered core is aligned with the light transmitting area of said fiber bundle and light radiating from said coupler initiates the propagation of light waves in the optical waveguides of said bundle.

9. An optical communication system in accordance with claim 8 wherein the area of said small diameter endface of said tapered core is substantially equal to that of the light transmitting portion of the first surface of said diode.

10. An optical communication system in accordance with claim 8 wherein the refractive index of said core varies gradually.

11. An optical communication system in accordance with claim 8 wherein said core consists of a plurality of regions, each having a refractive index different from the adjacent region.

12. An optical communication system comprising
 a light emitting diode for providing optical signals,
 a fiber bundle having a plurality of optical waveguides disposed in side-by-side relation, all of said waveguides being adapted to transmit said optical signals,
 a light-coupler having a tapered core of transparent material and a layer of transparent cladding material disposed upon the surface of said core, the refractive index of said core material being greater than that of said cladding material, said core having large and small diameter endfaces that are perpendicular to the axis thereof, the small diameter endface of said core being disposed adjacent to the light emitting area of said diode, said small diameter endface being at least as large as said light emitting area of said diode, and
 means for supporting said large diameter endface adjacent to an end of said fiber bundle so that said large diameter end face is aligned with the light transmitting area of said fiber bundle and optical signals emitted by said diode are propagated in all of the waveguides of said bundle.

13. A transmission system for the purpose of guiding optical wave energy comprising in longitudinal axial alignment,
 a light source,
 a light coupling section of fiber having a tapered core of transparent material and a layer of transparent cladding material disposed upon the surface of said tapered core, the refractive index of said core material being greater than that of the cladding, and
 an optical waveguide section of fiber;
 wherein the refractive index of the core of said tapered coupling section of fiber decreases longitudinally from a predetermined value at the small end thereof adjacent said light source to a lower value at the large end adjacent said waveguide section.

* * * * *